Aug. 17, 1937.  F. KAPPREL  2,090,419
LOCOMOTIVE CAB AND APPURTENANCES
Filed Aug. 27, 1934   2 Sheets-Sheet 1
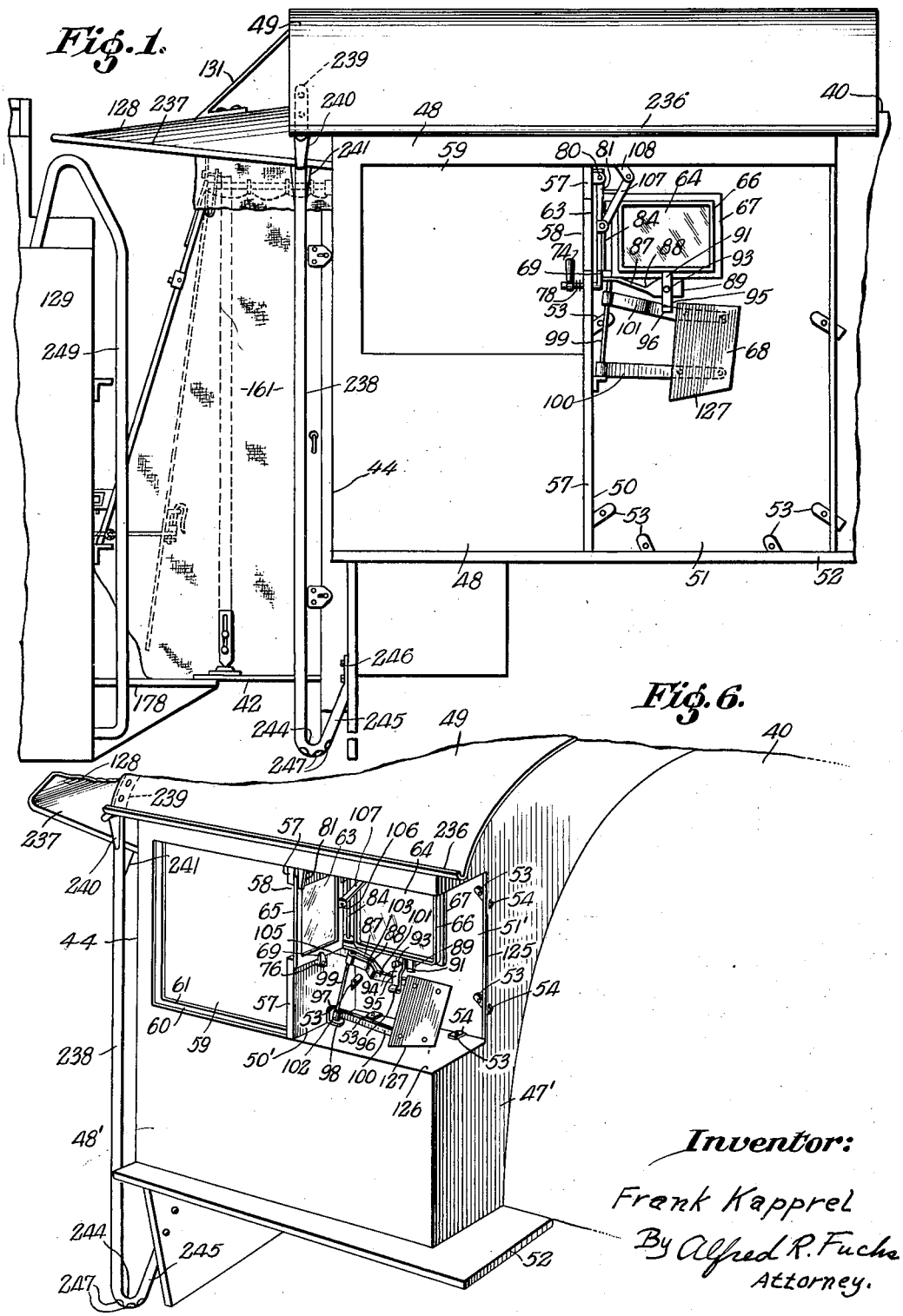
Inventor:
Frank Kapprel
By Alfred R. Fuchs
Attorney.

Aug. 17, 1937.                F. KAPPREL                    2,090,419
                    LOCOMOTIVE CAB AND APPURTENANCES
                   Filed Aug. 27, 1934        2 Sheets-Sheet 2
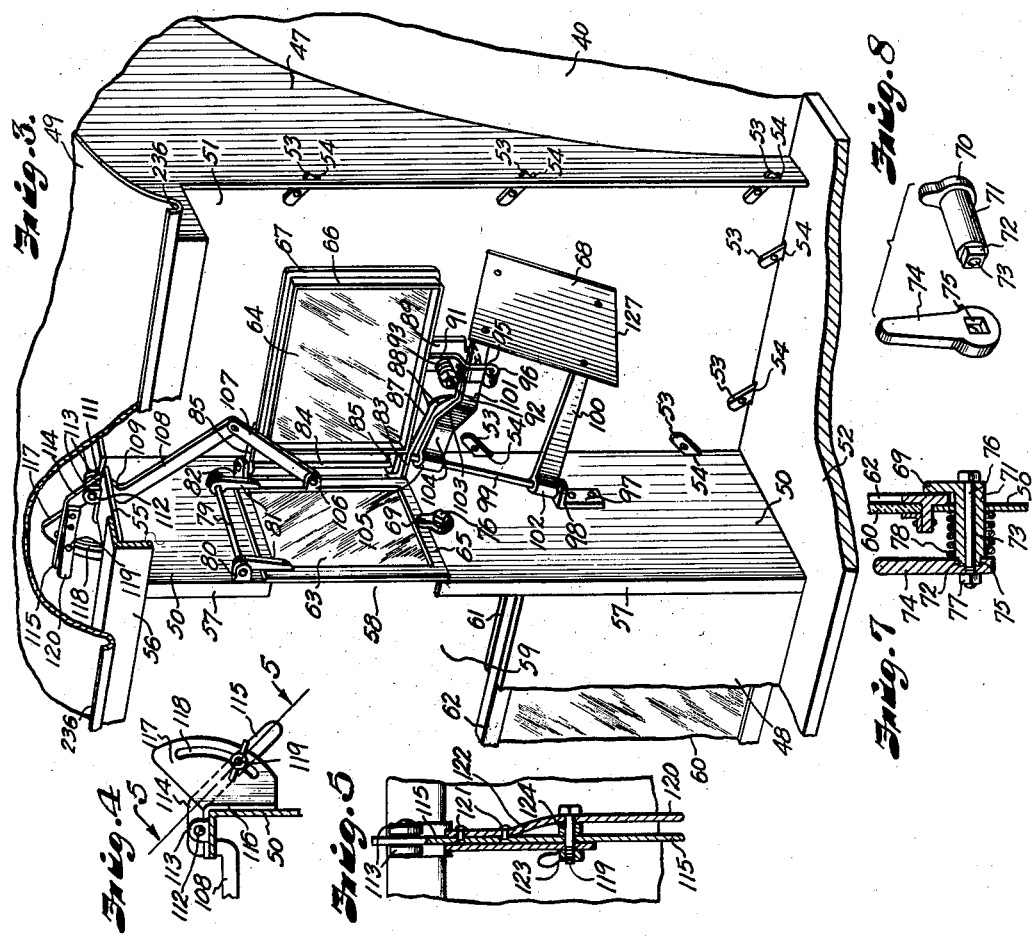
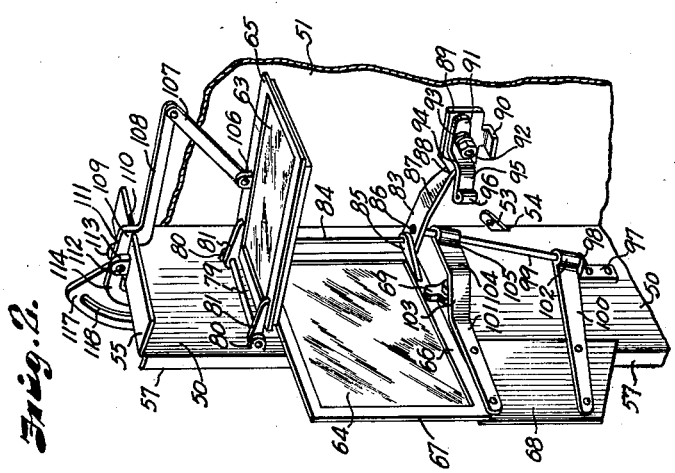
INVENTOR.
Frank Kapprel
By Alfred R. Fuchs
ATTORNEY.

Patented Aug. 17, 1937

2,090,419

UNITED STATES PATENT OFFICE 2,090,419

LOCOMOTIVE CAB AND APPURTENANCES

Frank Kapprel, Kansas City, Mo.

Application August 27, 1934, Serial No. 741,605

22 Claims. (Cl. 105—456)

My invention relates to locomotive cabs, and more particularly to a cab designed to increase the safety of operation of the locomotive.

One of the great difficulties experienced in present day locomotive operation is that the boiler of the locomotive is so large and the cab relatively so small and projects such a small distance beyond the sides of the boiler, or fire box, that the field of vision of the engine man is so reduced when looking through the opening ordinarily provided in the front wall of the cab, that he can see practically nothing adjacent the right-of-way to the left of the locomotive from the right hand side thereof, nor to the right of the locomotive when looking from the left hand side thereof. The front wall portion provided with the opening is usually in the form of a door, although not necessarily so. It is accordingly necessary and customary for the engine man to ordinarily lean out of the window at the side of the cab a considerable distance in operating the locomotive, in order that he may see satisfactorily at a reasonable distance forwardly beyond the locomotive on the opposite side of the right-of-way from that on which he is located in the locomotive cab. While this is customary and necessary in order that sufficient vision be obtained that accidents at highway crossings can be avoided, this is impossible in bad weather and as a result it is a well known fact that locomotive engineers are driving their locomotives substantially blindly in extremely bad weather, or even in moderately bad weather, because both the engineer and the fireman can see little or nothing through the window located at the forward end of the cab as it is ordinarily constructed. This is due to the fact that the window opening is located so far from the seats, or operating positions, of the engine men, and is of such small transverse dimension. This reduces the field of vision not only on the side of the engine man nearest the boiler, but also of the right-of-way on the side away from the boiler when the side window, or windows, of the cab are closed and the engine men are attempting to see forwardly through the small windows of the cab spaced at a considerable distance from them, (usually at least four or five feet, and sometimes much more than that). Furthermore, if the glass in this window is at all dirty, and it is practically always dirty in locomotives in operation even with frequent cleaning during the use of the locomotive on any run, there can be little or nothing seen, even straight ahead, through it at the distance from the pane that the engine men are located.

It is accordingly a purpose of my invention to provide a locomotive cab so constructed that the field of vision is not only greatly increased under all operating conditions, but is particularly greatly increased during operating conditions in bad weather, and the visibility within the field is very greatly increased under all conditions. This object is attained by rearranging certain walls of the cab so as to bring certain forward wall portions thereof closely in front of the engine men, and to provide openings in these front wall portions that are so arranged as to obtain the maximum visibility therethrough, and so that the engine men can shift from one position to another, such as from a normal upright sitting position to one assumed when leaning out the side window opening, without his vision being interfered with by any posts or other obstructions during such a shift. An important advantage of my invention is that it makes possible the operation of the locomotive under conditions of better visibility with the side windows closed, than could be obtained in severe weather by leaning out the window. This is true because the engine men have a greater field of vision through a window that is closer to them, and any small amount of dirt that may be thereon will not interfere materially with their vision when the window is closely adjacent their eyes. Furthermore the window is in a position where it can be readily reached by them, without moving from their operating position, to be cleaned, should this become necessary.

In the embodiment of the invention shown, the result is obtained by setting back a portion of the front wall, or forward wall, of the cab, from the forward end of the cab so that it is closely adjacent the engine man's seat, and providing an opening therein so located as to eliminate any corner post, or posts, where the opening for visibility is provided. Such location of the wall reduces the window opening in the side wall very materially, and in order to provide for the safety of the engine men in case it is necessary to make a hurried exit from the cab, such as where a collision is imminent, it has been found desirable to otherwise rearrange the cab and its appurtenances so as to provide for a quick exit through the gangway between the cab and tender by a short path from the seat of either engine man. The front wall portion closely adjacent the engine man's seat is obtained, preferably, by reducing the front portion of the cab partly in width and partly in height, to provide an offset therein, provided with an opening for a vision window.

It is a purpose of the invention to provide means associated with the opening in the front wall of the cab for closing said opening, which comprises a transparent closure member that is swingable about a horizontal axis to various angular positions relative to this forward wall, and to provide a closure member that has a transparent pane therein, which is swingable about a vertical, or substantially vertical, axis into and out of closing position, said last mentioned closure member projecting an appreciable distance beyond the side edge of said forward wall portion to provide a transparent wind shield beyond the side wall of the cab, whereby the engine man is protected considerably from the elements when he leans out of the window provided in said side wall.

It is a further purpose of my invention to provide a shield that cooperates with said closure member and is movable into position below the same so as to form a downward extension therefrom to further protect the engine man when he is so leaning from the window of the cab. One of the purposes of the invention is to so mount said shield and said transparent closure member that the same can be independently swung into and out of operative position, and can be individually locked in inoperative position.

Another object of my invention is to provide the transparent closure member, that is mounted for swinging movement about a substantially horizontal axis, with means whereby the same can be moved to and held in any desired angular position, with ease, from the engine man's seat.

Other objects and advantages of my invention will appear as the description of the drawings proceeds. I desire to have it understood, however, that I do not intend to limit myself to the particular details shown or described, except as defined in the claims.

In the drawings:

Fig. 1 is a view in side elevation of a portion of the locomotive and tender to which my invention is applied.

Fig. 2 is a fragmentary perspective view of a portion of the cab, showing the forward wall portion having the vision aperture therein and one of the closure members and the shield in operative position.

Fig. 3 is a perspective view of a portion of the forward end of the cab partly broken away, showing the shield and one of the closure members in inoperative position, and the closure member mounted on a substantially horizontal axis in closing position.

Fig. 4 is a fragmentary view partly in vertical section and partly in elevation of the adjustable holding means for the closure member, which is pivoted on the horizontal axis.

Fig. 5 is an enlarged sectional view taken on the line 5—5 of Fig. 4.

Fig. 6 is a fragmentary perspective view of a portion of the cab, showing a slightly modified form of the invention.

Fig. 7 is a fragmentary vertical sectional view of the operating means for the fastener for either of the windows that cooperate with the vision opening in the front wall portion of the cab, and Fig. 8 is a perspective view of the handle and locking portions of the fastening member separated.

My invention is shown as being applied to a locomotive that has a boiler 40, the term boiler being applied to the steam and water containing portion and the fire box portion as a unit. As is well known, the fire box portion of this boiler extends well into the cab of the locomotive, the cab extending over and around the sides of said fire box portion. The cab is shown as having the apron 42, which is hinged to the cab, rear wall portions 44, providing an opening between the same, through which entrance is obtained to the cab, a front wall 47, a side wall portion 48 and a roof 49.

In the form of the invention shown in Figs. 1, 2 and 3, the front wall 47 is not made so as to extend straight across the entire front of the cab, but a portion of the front wall, which is designated as the forward wall portion 50, is set back from the front end of the cab a considerable distance, thus providing an offset in the cab, a detachable side wall panel 51 being provided between the front wall portion 47 and the forward wall portion 50 to thus complete the enclosure at the offset in the cab provided by setting back the front wall portion 50 and setting in the side wall portion, or panel, 51. The usual running board 52 is provided, which projects slightly beyond the side wall portion 48 and to a greater extent beyond the side wall portion 51. The panel 51 is secured in position so as to be removable to obtain access to apparatus that may be in back of the same within the cab and any means for securing the same detachably in position may be provided, the means shown comprising the pivoted fingers 53, which enter slots 54 in the running board, the forward wall portion 50 and the front wall portion 47.

The forward wall portion 50 has a top flange 55, which is secured in any desired manner to the angle member 56, forming a part of the cab structure and is provided with a stiffening flange 57 extending rearwardly from the lateral, or vertical side edge of said wall portion 50. The wall portion 50 is provided with an opening 58 therein, which may be referred to as a vision opening, said opening extending from a point at any desired distance from the inner edge of the wall portion 50, or that adjacent the panel 51, to and through the outer edge thereof, or that edge having the flange 57, the flange being, of course, interrupted where the opening 56 intersects this edge. The side wall portion 48 is also provided with an opening 59, which may be closed by means of a window 60, which is slidable into a pocket 61 in the side wall 48. The opening 59 extends to the forward edge of the side wall portion 48 and thus intersects the opening 58. It will thus be obvious that if no closure members are in either the opening 58 of the opening 59 there is a clear unobstructed opening, without any posts, bars, or other structural members to interfere with the vision from the inner edge of the opening 58, or that edge nearest the boiler 47, to the rear edge of the window opening 59. The window 60 is, of course, provided with a frame 62 and it is desirable that this frame be made as small in section as it can possibly be made, being made as small as practicable for holding the glass or other transparent pane provided in the window.

Cooperating with the opening 58 are suitable closure members, two different closure members being shown as being provided, which are for use under different circumstances. Said closure members comprise the closure member 63, which is made up of a frame and a transparent pane, such as a pane of glass, and a closure member 64, which also comprises a transparent pane mounted within a frame. The frame 65 of the closure member 63 is mounted for pivotal movement about a substantially horizontal axis, said closure member being of a size to overlap and completely close the opening 58 when in a down position. The closure member 64 is provided with a frame 66 that has a peripheral flange 67 thereon, and this frame is mounted for pivotal movement about an axis that is substantially vertical. In Fig. 2 the closure member 64 is shown in closing position, and in Fig. 3 the closure member 63 is shown in closing position. The frames 65 and 66 are also made as small in cross section as practicable so as to not obstruct the vision any more than is absolutely necessary.

Referring to Fig. 2 it will be noted that the closure member 64 is of considerably greater lateral extent than the opening 58, and that the portion thereof that projects laterally beyond the vertical outer edge of the wall portion 50 serves as a wind shield member for the engine man that is seated in the seat 46 and leaning out through the opening 59. To further protect the engine man while leaning out of the opening 59 in cold weather, or other inclement weather, a metallic shield 68 is provided, which cooperates with the closure member 64 to form a downward extension from the same, projecting laterally beyond the wall 59 when in the position shown in Fig. 2. When in this position, the member 68 is in face to face engagement with the forward face of the wall portion 50, and the peripheral flange 67 on the frame 66 of the closure member 64, which overlaps the top portion of the shield 68, engages the forward face of the shield 68. The parts are held in this position by means of a locking finger 69 shown in engagement with the frame member 66 in Fig. 2, said member 69 not only holding the closure member 64 in the position shown in Fig. 2, but also the shield 68. Said finger 69 is provided on a head 70 provided on the tubular member 71, which is provided with a square end portion 72, and which has a longitudinal passage 73 therethrough, (see Figs. 7 and 8). An operating handle 74 having a square opening 75 therein engaging with the square end 72 on the member 71 is provided for operating this locking member having the finger 69 thereon, the parts being held in assembled relation by means of a bolt 76 and nut 77, and a compression coil spring 78 being provided for frictionally holding the finger 69 in engagement with the member that it is holding in closing position. The finger 69 not only cooperates with the frame 66, but also with the frame 65, as will be evident from Fig. 3, holding the same in closing position when the closure member 63 is in its lowermost position.

The closure member 63 is mounted for pivotal movement on a pivot rod, or pin, 79, mounted in the pivot ears 80 on the wall portion 50, and the frame 65 is provided with endwise projecting ears 81, which have openings therein for rotatably receiving the pivot pin 79. A pivot ear 82 also projects forwardly from the wall portion 50, and a bracket 83 projects forwardly from said wall portion, the pivot pin, or rod, 84 being mounted in aligning openings in the bracket 83 and the ear 82, and the endwise projecting ears 85 on the frame 66 having openings therein pivotally receiving the rod 84, thus mounting the closure member 64 for swinging movement about a substantially vertical axis. The bracket 83 has an opening 86 therein, which is located forwardly of, or at a greater distance from the wall portion 50 than the opening that receives the pivot pin 84. Said bracket 83 further extends at a slight downward inclination from the location of the opening 86, as indicated at 87, to a twist therein at 88, whereby the forward end portion 89 thereof extends substantially perpendicularly to the rear portion thereof, said forward end portion 89 being located considerably below the point of attachment of the bracket 83 to the wall portion 50.

The forward end portion 89 of said bracket is provided with an outwardly extending stop ear, or finger, 90 and with a pivotally mounted locking member 91, which is mounted on a pivot bolt 92 that has a compression coil spring 93 located between the nut thereon and the finger 91 to frictionally hold the same in adjusted position. The finger 91 has an offset 94 therein to provide a locking portion 95 thereon that is offset outwardly from the portion 91, and which terminates in a bead portion 96.

A bracket 97 is provided on the forward wall portion 50, which is located outwardly a considerable distance from the junction of the wall 50 with the panel 51, and an opening is provided in the forwardly projecting ear 98 on said bracket, through which the pivot rod 99 extends, said pivot rod also extending through the opening 86 and thus being located in an inclined position so that the upper end thereof is outwardly further from the wall 50 than the lower end thereof, and said lower end is further from the panel 51 than the upper end. This is necessary for a purpose to be described below. The shield 68 is mounted on a pair of brackets 100 and 101, the bracket 100 having a bearing 102 therein for the pivot rod 99, and the bracket 101 having an inclined offset 103 therein and a portion 104 extending substantially parallel to the portion connected with the shield, but offset a considerable distance therefrom, which terminates in a bearing member 105 for the pivot rod 99.

Upon reference to Figs. 2 and 3 it will be seen that due to this arrangement of brackets 100 and 101, and due to the inclined pivot member 99, the shield 68, when in the position shown in Fig. 2, will have its side edges extending substantially perpendicularly to the bottom of the frame 66 of the closure member 64, and will have its top edge located so that it will slightly overlap said frame, whereby the flange 67 on said frame 66 will serve to hold the shield 68 in the position shown in Fig. 2. When the member 63 is swung to the position shown in Fig. 3 it will be forwardly and downwardly inclined relative to the closure member 64, with the bracket 101 in engagement with the stop finger 90, and the locking member 91 can then be swung to the position shown in Fig. 3 with the one end thereof in engagement with the flange 67 to hold the closure member 64 adjacent the panel 51, and with the offset finger portion 95 in engagement with the bracket 101 to hold the same against said stop finger 90, the bead, or curled end 96 being provided in order that the member 95 can slide readily over the edge of the bracket 101 in swinging to locking position.

It will be evident upon reference to Figs. 1 and 3 that the closure member 64 can be swung to closing position without moving the shield 68 to closing position, should this be desired, and the locking member 91 manipulated to hold the shield 68 in inoperative position, should this be desired.

It will also be obvious that while the shield 68 can be swung to the position shown in Fig. 2, and then the closure member 64 swung to that position without either of these members interfering with the other, that when the closure member 64 approaches its closing position it will overlap the member 68, as previously described.

The closure member 63 is provided with an ear 106, projecting forwardly from one side member of the frame thereof to which a link 107 is pivoted, which, in turn, is pivoted to the link that has an offset 109 therein passing through a slot 110 in the flange 55, and has a portion 111 extending substantially parallel to the main portion of the link 108, but offset therefrom, said portion 111 being pivotally mounted on the pivot pin 112 mounted between the pivot ears 113. The link 108 thus constitutes a lever having a forwardly extending arm, to which the link 107 is connected, and a rearwardly extending arm 114 that has an obliquely extending portion 115 thereon, constituting an operating member, or handle, which is utilized for moving the closure member 63 to various desired positions.

Secured to the forward wall 50 by means of an angular bracket 116, is a segmental plate 117 that has an arcuate slot 118, in which a bolt 119 is slidably mounted, said bolt 119 passing through an opening in the handle member 115, and through an aligning opening in a spring arm 120, secured face to face by any suitable securing means, such as the rivets 121, to the member 115 and having an offset 122 therein away from the member 115. The bolt-like member 119 has a wing nut 123 provided thereon for adjusting the same, and a sleeve 124 is mounted on the bolt 119 between the arm, or finger, 120 and the member 115. The spring arm, or finger, 120 acting on the head of the bolt 119 will frictionally hold the member 115 in any adjusted position, and thus the closure member 63 in any adjusted position. Under certain conditions, however, it will be found to be extremely difficult, if not impossible, to hold the closure member 63 in an angular position by frictional means, and at such times the wing nut 123 can be tightened up to the extent shown in Fig. 5, whereupon the member 115 will be clamped in contact with the member 117 between the sleeve 124 and said nut 123. It will be obvious that the member 63 can be moved to various angular positions with the member 64, in either a fully opened or fully closed position. The closure member 63 is particularly useful under certain bad weather conditions when it may be found desirable to ordinarily close the opening 58, but it may at times be necessary to open the same widely to observe signals and train order boards, or adjust the same to an angular position to only partly close the opening, and yet keep out rain or snow.

In Figs. 1 and 3 the wall portion 50 constituting the offset forward wall or set backward wall portion of the cab, is shown as extending from the running board 52 substantially to the roof 49. This is very desirable where a very large boiler, or fire box, is provided on the locomotive leaving but very little space at each side thereof at the forward end of the cab. In locomotives having smaller fire boxes and smaller boilers, it may be found desirable to provide the arrangement shown in Fig. 6 in which the boiler, the roof of the cab and the running board are indicated by the same numerals as previously applied thereto. However, in this form of the invention the side wall is extended further forwardly, than in the case where the boiler, or fire box, is larger, as shown in Figs. 1 and 6, said side wall being indicated by the numeral 48' and extending forwardly to the front wall 47', which is cut away at 125 to provide an opening therein of the full extent of the front wall portion 50', which is offset, or set back, in the same manner as the wall portion 50, previously described, a top wall 126 being provided between the offset forward wall portion 50' and the wall portion 47' extending from the side wall 48' to the panel 51', closing the space between the wall 47' and the wall 50'. The wall 126 is at least as low as the bottom of the window opening 59 and the closure members for the window opening 59 and for the vision opening 58 in the wall 50' are made in the same manner and mounted in the same manner as previously described, and the panel 51' is held in the same manner as previously described. In this arrangement the shield 68 will come closely adjacent the top wall 126, and in order to make the shield of universal application, the bottom edge thereof is inclined, as indicated at 127, so that the same will clear the top wall 126 when in the position shown in Fig. 6, and will still give a substantial shielding effect adjacent the wall portion 50, or 50', as the case may be. The same reference numerals are applied to the corresponding parts in Fig. 6 and Figs. 1 to 5 inclusive.

The hood 128 is depressed a considerable distance below the roof 49, as will be evident from Fig. 1, and extends backwardly from substantially the rear wall portions 46 of the cab to a point such that the tender 129 is slightly overlapped thereby, said hood being secured to the wall portion 130 by means of a bracket 131 at the center thereof, and to the wall portions 44 by any suitable means. The hood 128 is located at a standard height from the deck 41 of the locomotive, the height of the wall 130 and of the roof 49 above the hood 128 varying in accordance with the over-all height of the cab of the locomotive to which my improvements may be applied. The curtains enclosing the space between the cab and tender are indicated by the numeral 161, there being a pair of said curtains, the deck of the tender being indicated by the numeral 178.

In order to assure safety of exit through the gangway under bad weather conditions it is desirable to provide drainage means for the hood 128 and the roof 49. A gutter 236 is accordingly provided on the roof 49, and a gutter 237 is provided on the hood 128. It is necessary to provide hand holds, or grab irons, on both sides of the gangway, and the grab iron 238 provided on the cab is made in the form of a tube, or pipe, which has a flattened end portion 239 that is riveted to the inner face of the roof 49. Said hollow grab iron 238 comprises a down spout for receiving the water from the gutters 236 and 237. Means for catching the water from the gutters is provided, comprising the funnel-like laterally projecting members 240 and 241 adjacent the upper end of said down spout 238.

The grab iron 238 is provided with a curved portion 244 adjacent the bottom thereof, and an upwardly inclined portion 245, which is secured to the cab in the usual manner, as by providing a flat end thereon at 246 that is riveted to a cross piece on the cab. Openings 247 are provided in the lower portion of the curve 244 for discharge of water at one side of the gangway below the apron on the cab. The grab iron 249 on the tender is made in the usual manner that is now customary.

What I claim is:

1. In a locomotive, a cab having a forward wall provided with an offset to provide a portion set back from the forward end of said cab, said forward wall portion having an opening therein.

2. In a locomotive, a cab having a forward wall portion set back from the forward end thereof and a side wall, said forward wall portion having an opening therein extending through the vertical edge of said wall portion at its intersection with said side wall.

3. In a locomotive, a cab having a forward wall portion set back from the forward end thereof and a side wall, said forward wall portion having an opening therein, and said side wall having an opening intersecting said opening in said forward wall portion.

4. In a locomotive, a cab having a forward wall portion set back from the forward end thereof, a side wall, said forward wall portion having an opening therein, and said side wall having an opening intersecting said opening in said forward wall portion, and a transparent closure for each of said openings.

5. In a locomotive, a cab having a forward wall portion set back from the forward end thereof, said forward wall portion having an opening therein and a pair of transparent closure members for said opening, one of which is swingable about a substantially horizontal axis and the other of which is swingable about a substantially vertical axis.

6. In a locomotive, a cab having a forward wall portion set back from the forward end thereof, said forward wall portion having an opening therein, and a shield projecting laterally from said cab adjacent said opening in said forward wall portion.

7. In a locomotive, a cab having a forward wall portion set back from the forward end thereof, a side wall, said forward wall portion having an opening therein and said side wall having an opening intersecting said opening in said forward wall portion, and a shield mounted for swinging movement into laterally projecting relation to said side wall adjacent said opening in said forward wall portion.

8. In a locomotive, a cab having a forward wall portion set back from the forward end thereof and a side wall, said forward wall portion having an opening therein extending through the vertical edge of said forward wall portion at its intersection with said side wall, a frame mounted to be swung into said opening, said frame extending laterally beyond said cab and a transparent pane therein projecting laterally beyond said cab.

9. In a locomotive, a cab having a forward wall portion set back from the forward end thereof and a side wall, said forward wall portion having an opening therein extending through the vertical edge of said forward wall portion at its intersection with said side wall, a frame mounted to be swung into said opening, said frame extending laterally beyond said cab, a transparent pane therein projecting laterally beyond said cab, and a shield mounted for swinging movement into laterally projecting relation to said side wall immediately below the laterally projecting portion of said frame.

10. In a locomotive, a cab having a forward wall portion set back from the forward end thereof, said forward wall portion having an opening therein, a transparent closure for said opening, means for mounting said closure for swinging movement about a substantially horizontal axis and means for holding said closure in any desired angular position relative to said wall.

11. In a locomotive, a cab having a forward wall portion set back from the forward end thereof, a side wall, said forward wall portion having an opening therein, and said side wall having an opening intersecting said opening in said forward wall portion, a window pocket in said side wall and a vertically slidable window adapted to close said opening in said side wall and to drop into said pocket.

12. In a locomotive, a cab having a forward wall portion set back from the forward end thereof, a side wall, said forward wall portion having an opening therein, and said side wall having an opening intersecting said opening in said forward wall portion, and a transparent closure for each of said openings, the closure for said front wall opening being swingable into and out of closing position and the closure for said side wall opening being vertically slidable into and out of closing position.

13. In a locomotive, a cab having a forward wall portion set back from the forward end thereof, said forward wall portion having an opening therein, and a shield projecting laterally from said cab adjacent said opening in said forward wall portion, said shield being mounted to swing into and out of operative position about an inclined axis.

14. In a locomotive, a cab having a forward wall portion set back from, the forward end thereof, said forward wall portion having an opening therein, and a shield projecting laterally from said cab adjacent said opening in said forward wall portion, said shield being mounted to swing into and out of operative position about an axis inclined both laterally and forwardly from the vertical.

15. In a locomotive, a cab having a forward wall portion set back from the forward end thereof, a side wall, said forward wall portion having an opening therein and said side wall having an opening intersecting said opening in said forward wall portion, a shield mounted for swinging movement into laterally projecting relation to said side wall adjacent said opening in said forward wall portion, and releasable means for holding said shield in inoperative position.

16. In a locomotive, a cab having a forward wall portion set back from the forward end thereof and a side wall, said forward wall portion having an opening therein extending through the vertical edge of said forward wall portion at its intersection with said side wall, a frame mounted to be swung into said opening, said frame extending laterally beyond said cab, a transparent pane therein projecting laterally beyond said cab, and releasable means for holding said frame in a retracted position.

17. In a locomotive, a cab having a forward wall portion set back from the forward end thereof and a side wall, said forward wall portion having an opening therein extending through the vertical edge of said forward wall portion at its intersection with said side wall, a frame mounted to be swung into said opening, said frame extending laterally beyond said cab, a transparent pane therein projecting laterally beyond said cab, and a shield mounted for swinging movement into laterally projecting relation to said side wall immediately below the laterally projecting portion of said frame with said shield and frame in overlapping engagement.

18. In a locomotive, a cab having a forward wall portion set back from the forward end thereof and a side wall, said forward wall portion having an opening therein extending through the vertical edge of said forward wall portion at its intersection with said side wall, a frame mounted to be swung into said opening, said frame extending laterally beyond said cab, a transparent pane therein projecting laterally beyond said cab, a shield mounted for swinging movement into laterally projecting relation to said side wall immediately below the laterally projecting portion of said frame, and means for holding both said shield and said frame in inoperative position.

19. In a locomotive, a cab having a forward wall portion set back from the forward end thereof and a side wall, said forward wall portion having an opening therein extending through the vertical edge of said forward wall portion at its intersection with said side wall, a frame mounted to be swung into said opening, said frame extending laterally beyond said cab, a transparent pane therein projecting laterally beyond said cab, a shield mounted for swinging movement into laterally projecting relation to said side wall immediately below the laterally projecting portion of said frame, and means for holding both said shield and said frame in inoperative position, said shield and frame being so mounted as to be movable past each other when in inoperative position.

20. In a locomotive, a cab having a forward wall portion set back from the forward end thereof, said forward wall portion having an opening therein, a transparent closure for said opening, means for mounting said closure for swinging movement about a substantially horizontal axis and means for holding said closure in any desired angular position relative to said wall, comprising a slotted segment, a handle, resilient means on said handle and means on said handle engaging said slot and said resilient means.

21. In a locomotive, a cab having a forward wall portion set back from the forward end thereof and a side wall, said forward wall portion having an opening therein extending through the vertical edge of said forward wall portion at its intersection with said side wall, a frame mounted to be swung into said opening, said frame extending laterally beyond said cab, a transparent pane therein projecting laterally beyond said cab, a second transparent closure for said opening mounted for swinging movement about a substantially horizontal axis, and means for holding each of said closures out of the path of the other thereof.

22. In a locomotive, a cab reduced in width and height from its forward end to a point a desired distance rearwardly from said forward end to provide an offset in the front wall thereof, said cab having a side wall having a window opening therein, said front wall having an opening intersecting said opening in said side wall to provide an uninterrupted field of vision from an operating station within said cab through said combined front and side wall openings in a horizontal plane through an angle approaching 180 degrees.

FRANK KAPPREL.